United States Patent
Belov et al.

(10) Patent No.: US 10,097,668 B2
(45) Date of Patent: Oct. 9, 2018

(54) SYSTEM AND METHOD OF REQUEST PROCESSING IN A DISTRIBUTED DATA PROCESSING NETWORK

(71) Applicant: YANDEX EUROPE AG, Lucerne (CH)

(72) Inventors: Mikhail Vladimirovich Belov, Vladimir (RU); Danil Aleksandrovich Zagoskin, Moscow (RU)

(73) Assignee: Yandex Europe AG, Lucerne (CH)

( * ) Notice: Subject to any disclaimer, the term of this patent is extended or adjusted under 35 U.S.C. 154(b) by 0 days.

(21) Appl. No.: 15/504,863

(22) PCT Filed: Jul. 16, 2015

(86) PCT No.: PCT/IB2015/055390
§ 371 (c)(1),
(2) Date: Feb. 17, 2017

(87) PCT Pub. No.: WO2016/120680
PCT Pub. Date: Aug. 4, 2016

(65) Prior Publication Data
US 2017/0272537 A1 Sep. 21, 2017

(30) Foreign Application Priority Data
Jan. 29, 2015 (RU) .............................. 2015102736

(51) Int. Cl.
*G06F 15/16* (2006.01)
*H04L 29/08* (2006.01)
*H04L 29/06* (2006.01)

(52) U.S. Cl.
CPC .............. *H04L 67/32* (2013.01); *H04L 67/02* (2013.01); *H04L 67/06* (2013.01); *H04L 67/1097* (2013.01); *H04L 67/42* (2013.01)

(58) Field of Classification Search
CPC ..... H04L 67/32; H04L 67/02; H04L 67/1097; H04L 67/42
See application file for complete search history.

(56) References Cited

U.S. PATENT DOCUMENTS

| | | |
|---|---|---|
| 5,117,351 A | 5/1992 | Miller |
| 5,522,077 A | 5/1996 | Cuthbert et al. |

(Continued)

FOREIGN PATENT DOCUMENTS

| | | |
|---|---|---|
| EA | 006307 B1 | 10/2005 |
| EP | 2765510 A1 | 8/2014 |

OTHER PUBLICATIONS

International Search Report and Written Opinion for PCT/IB2015/055390, dated Nov. 2, 2015, Blaine Copenheaver.

(Continued)

*Primary Examiner* — Viet D Vu
(74) *Attorney, Agent, or Firm* — BCF LLP

(57) ABSTRACT

A system and method of request processing; the method is executed on a first electronic device, connected to a second electronic device, the second electronic device is at least a part of a second subsystem; the first electronic device is at least a part of a first subsystem, the second subsystem and the first subsystem are at least a part of a distributed data processing system; the first electronic device and the second electronic device have a first subsystem identifier and a second subsystem identifier associated with them correspondingly. The method includes: receiving by the first electronic device from the second electronic device a request which should be processed and a first version of a request identifier; the first version of a request identifier includes: a unique invariable part of the request identifier and a second subsystem identifier; generating by the first electronic device the second version of the request identifier via including the (Continued)

first subsystem identifier into the first version of the request identifier.

19 Claims, 5 Drawing Sheets

(56) References Cited

U.S. PATENT DOCUMENTS

| | | | |
|---|---|---|---|
| 6,640,240 | B1 | 10/2003 | Hoffman et al. |
| 6,735,220 | B1 | 5/2004 | Shirriff |
| 6,862,711 | B1 | 3/2005 | Bahrs et al. |
| 8,301,589 | B2 | 10/2012 | Sen et al. |
| 8,346,848 | B2* | 1/2013 | Peiffer ............... H04L 29/06 709/201 |
| 8,635,617 | B2 | 1/2014 | Adler |
| 2002/0013832 | A1 | 1/2002 | Hubbard |
| 2002/0152393 | A1 | 10/2002 | Thoma et al. |
| 2002/0191593 | A1* | 12/2002 | O'Neill ............ H04L 29/12009 370/352 |
| 2005/0193097 | A1 | 9/2005 | Guthrie et al. |
| 2006/0075079 | A1 | 4/2006 | Powers et al. |
| 2007/0106673 | A1 | 5/2007 | Enenkiel |
| 2007/0174831 | A1 | 7/2007 | Lee et al. |
| 2007/0263671 | A1 | 11/2007 | Hu et al. |
| 2011/0179100 | A1 | 7/2011 | Kawai |
| 2011/0213876 | A1 | 9/2011 | Kumar et al. |
| 2012/0084779 | A1 | 4/2012 | Adler |
| 2012/0203988 | A1 | 8/2012 | Nakagawa et al. |
| 2014/0006578 | A1* | 1/2014 | Kohn ............... H04L 67/1027 709/223 |
| 2014/0188451 | A1 | 7/2014 | Asahara et al. |
| 2014/0215057 | A1 | 7/2014 | Walsh et al. |
| 2016/0286597 | A1* | 9/2016 | Eriksson ............ H04L 61/2007 |

OTHER PUBLICATIONS

StackOverflow, java—Generating a unique ID for every request in a distributed system—Stack Overflow, Generating a unique ID for every request in a distributed system, http://stackoverflow.com/questions/17934947/generating-a-unique-id-for-every-request-in-a-distributed-system, retrieved on Nov. 17, 2015.

Wikipedia, Universally unique identifier, https://en.wikipedia.org/wiki/Universally_unique_identifier, retrieved on Nov. 17, 2015.

Amit, Unique Id Generation in a distributed environment, http://amitjj.blogspot.ca/2013/04/unique-id-generation-in-distributed.html, Apr. 28, 2013, retrieved on Nov. 17, 2015.

Smith, Server Generated Keys: Unique IDs for Distributed Databases, Databases & Infrastructure, How Tos & Tutorials, Product Features, Jun. 23, 2014, https://orchestrate.io/blog/2014/06/23/server-generated-keys-unique-ids-for-distributed-databases/, retrieved on Nov. 17, 2015.

Ho, Distributed UUID Generation, Pragmatic Programming Techniques, http://horicky.blogspot.ca/2007/11/distributed-uuid-generation.html, Nov. 26, 2007, retrieved on Nov. 17, 2015.

English Abstract of EA 006307 retrieved from Espacenet on Mar. 10, 2016.

* cited by examiner

SYSTEM AND METHOD OF REQUEST PROCESSING IN A DISTRIBUTED DATA PROCESSING NETWORK

CROSS-REFERENCE

The present application claims priority to Russian Patent Application No. 2015102736, filed Jan. 29, 2015, entitled " СИСТЕМА И СПОСОБ ОБРАБОТКИ ЗАПРОСА В СЕТИ РАСПРЕДЕЛЕННОЙ ОБРАБОТКИ ДАННЫХ" the entirety of which is incorporated herein.

FIELD OF THE TECHNOLOGY

The present technology relates to a system and method of request processing in a distributed data processing network.

BACKGROUND

Currently in the field of computer technologies, data communication via communication networks is very common. Data communication may be performed via communication networks using various data communication protocols. Hyper Text Transfer Protocol (HTTP) is one of such protocols.

Hyper Text Transfer Protocol (HTTP) is an application-level communication protocol. Originally, HTTP was intended to transmit data in HTML, format. However, today it is used for transmitting any data. Originally HTTP was not intended to transport other protocols because it had redundancy and overhead in slow and unreliable networks. Today the role of HTTP as a transport becomes more significant because current communication networks are faster and safer; communication expenses are lower and HTTP is very convenient.

HTTP is based on a "client-server" technology, i.e. it is expected that there are consumers (clients) which trigger connection and send a request and there are providers (servers) which wait for connection to receive the request and perform required actions and send a result message back.

Currently HTTP is in common use in the World Wide Web for receiving information from web sites and loading information to web-sites including transmitting requests which can be processed.

HTTP is used as a "transport" for other application-level protocols such as SOAP (Simple Object Access Protocol), XML-RPC (Extensible Markup Language Remote Procedure Call), WebDAV (Web Distributed Authoring and Versioning, or DAV which is an extension set of HTTP that allows clients to perform cooperative actions such as file editing or file management on remote servers).

The main action object in HTTP is a resource which is associated with URI (Universal Resource Identifier) in a client request. Usually such resources are files hosted on a server but it can be other objects, for example, logical objects. The feature of HTTP is a possibility to indicate a representation of the same resource in a request and answer using different parameters: format, encoding, language and the like (a HTTP-header is used specifically for that purpose). Due to the possibility to indicate a coding method for a message, a client and server can exchange binary data, though this protocol is a text protocol.

HTTP is a stateless protocol. It means that between "request-answer" pairs there are no saved intermediate states. HTTP does not have previous requests and answers data and it does not support states internally.

Thus, although the conventional computer systems are decent, the improvement of these systems is still possible.

SUMMARY

It is an object of the present technology to ameliorate at least some of the inconveniences present in the prior art.

According to implementations of the present technology there is provided a computer-implemented method of processing a request. The method is executable on a first electronic device. The first electronic device is connected to a second electronic device. The second electronic device is at least a part of a second subsystem. The first electronic device is at least a part of a first subsystem. The second subsystem and the first subsystem are at least a part of a distributed data processing system. The first electronic device and the second electronic device have respectively a first subsystem identifier and a second subsystem identifier associated with them correspondingly. The method comprises: receiving, by the first electronic device from the second electronic device, the request to be processed and a first version of a request identifier, the first version of the request identifier comprising: an unique invariable part of the request identifier, and a second subsystem identifier; generating, by the first electronic device, a second version of the request identifier by including the first subsystem identifier into the first version of the request identifier.

In some implementations of the present technology, (i) the request to be processed, received by the first electronic device from the second electronic device, and (ii) the unique invariable part of the request identifier, and (iii) the first version of the request identifier, were generated by the second electronic device.

In some implementations of the present technology, (i) the request to be processed, received by the first electronic device from the second electronic device, had been previously received by the second electronic device from a client device, and (ii) the first version of the request identifier received by the first electronic device from the second electronic device was generated by the second electronic device, and generating the first version of the request identifier by the second electronic device was performed using one of: (a) the unique invariable part of the request identifier generated by the second electronic device and (b) the unique invariable part of the request identifier received by the second electronic device from the client device.

In some implementations of the present technology, a plurality of requests is processed in the distributed data processing network, and the unique invariable part of the request identifier is an alphanumeric sequence, said alphanumeric sequence being unique among other request identifiers.

In some implementations of the present technology, the distributed data processing network includes a third electronic device, the third electronic device being at least a part of a third subsystem, the third subsystem being at least a part of the distributed data processing network, the method further comprising transmitting, by the first electronic device to the third electronic device, the request and the second version of the request identifier associated with the request.

In some implementations of the present technology, the second version of the request identifier can be modified by the third electronic device by performing at least one, selected from: (i) by including a third subsystem identifier into the second version of the request identifier in addition to the second subsystem identifier and the first subsystem identifier; (ii) by excluding, from the second version of the request identifier, at least one selected from: the second subsystem identifier and the first subsystem identifier.

In some implementations of the present technology, the first electronic device stores the second version of the request identifier in a first data storage.

In some implementations of the present technology, the first version of the request identifier was stored by the second electronic device in a second data storage.

In some implementations of the present technology, the first electronic device stores the information about request processing by the first electronic device in the first data storage.

In some implementations of the present technology, the information about request processing by the second electronic device was stored by the second electronic device in the second data storage.

In some implementations of the present technology, the second data storage is a second subsystem log file and the first data storage is a first subsystem log file.

In some implementations of the present technology, the second data storage and first data storage are implemented as a log file of the distributed data processing network.

In some implementations of the present technology, the second data storage and first data storage are implemented as a common database.

In some implementations of the present technology, the method further comprises receiving, by the first electronic device, a demand to provide a request processing history.

In some implementations of the present technology, responsive to receiving the demand to provide the request processing history, the first electronic device: (i) reads, from the second version of the request identifier, all the subsystem identifiers, and (ii) accesses data storages of respective subsystems to obtain information about request processing.

In some implementations of the present technology, responsive to receiving the demand to provide the request processing history, the first electronic device: receives a most complete version of the request identifier, wherein, to obtain the most complete version of the request identifier, the first electronic device: receives from any one, selected from: (i) the log file of the distributed data processing network, and (ii) the common database, all versions of the request identifier being stored in a respective data storage and: responsive to more than one version of the request identifier is available, determines a version of the request identifier comprising maximum subsystem identifiers as the most complete version of the request identifier, and responsive to one version of the request identifier is available, determines this version of the request identifier as the most complete version of the request identifier, and reads, from the most complete version of the request identifier, all subsystem identifiers comprising in the most complete version of the request identifier, and accesses data storages of respective subsystems for retrieving from them the information about request processing.

In some implementations of the present technology, the distributed data processing network comprises a third electronic device, the third electronic device being at least a part of a third subsystem, the third subsystem being at least a part of the distributed data processing network, and the first electronic device receives the demand to provide the request processing history from the third electronic device.

Another object of the present technology is a first electronic device. The first electronic device includes a communication interface for providing connection over a communication network. The first electronic device comprises a processor. The processor is operationally connected with the communication interface. The first electronic device is connected with a second electronic device. The second electronic device is at least a part of a second subsystem. The first electronic device is at least a part of a first subsystem. The second subsystem and the first subsystem are at least a part of a distributed data processing network. The first electronic device and the second electronic device have respectively a first subsystem identifier and a first subsystem identifier associated with them correspondingly. The processor of the first electronic device is configured such that the first electronic device may perform: receiving, by the first electronic device from the second electronic device, a request to be processed and a first version of a request identifier, the first version of a request identifier comprising: an unique invariable part of the request identifier and a second subsystem identifier; generating, by the first electronic device, a second version of the request identifier by including the first subsystem identifier into the first version of the request identifier.

In some implementations of the first electronic device, (i) the request to be processed, received by the first electronic device from the second electronic device, and (ii) the unique invariable part of the request identifier, and (iii) the first version of the request identifier, were generated by the second electronic device.

In some implementations of the first electronic device, (i) the request to be processed, received by the first electronic device from the second electronic device, had been previously received by the second electronic device from a client device, and (ii) the first version of the request identifier received by the first electronic device from the second electronic device was generated by the second electronic device, and generating the first version of the request identifier by the second electronic device was performed using one of: (a) the unique invariable part of the request identifier generated by the second electronic device and (b) the unique invariable part of the request identifier received by the second electronic device from the client device.

In some implementations of the first electronic device, a plurality of requests is processed in the distributed data processing network, and the unique invariable part of the request identifier is an alphanumeric sequence, the alphanumeric sequence being unique among other request identifiers.

In some implementations of the first electronic device, the distributed data processing network includes a third electronic device, the third electronic device being at least a part of a third subsystem, the third subsystem being at least a part of the distributed data processing network, and the processor of the first electronic device is further configured to perform transmitting, by the first electronic device to the third electronic device, the request and the second version of the request identifier associated with the request.

In some implementations of the first electronic device, the second version of the request identifier can be modified by the third electronic device by performing at least one, selected from: (i) by including a third subsystem identifier into the second version of the request identifier in addition to the second subsystem identifier and the first subsystem identifier; (ii) by excluding, from the second version of the request identifier, at least one selected from: the second subsystem identifier and the first subsystem identifier.

In some implementations of the first electronic device, the processor is configured such that the first electronic device can store the second version of the request identifier in a first data storage.

In some implementations of the first electronic device, the first version of the request identifier was stored by the second electronic device in a second data storage.

In some implementations of the first electronic device, the processor is configured such that the first electronic device may store the information about request processing by the first electronic device in the first data storage.

In some implementations of the first electronic device, the information about request processing by the second electronic device was stored by the second electronic device in the second data storage.

In some implementations of the first electronic device, the second data storage is a second subsystem log file and the first data storage is a first subsystem log file.

In some implementations of the first electronic device, the second data storage and first data storage are implemented as a log file of the distributed data processing network.

In some implementations of the first electronic device, the second data storage and first data storage are implemented as a common database.

In some implementations of the first electronic device, the processor of the first electronic device is configured such that the first electronic device may receive a demand to provide a request processing history.

In some implementations of the first electronic device, the processor of the first electronic device is configured such that responsive to receiving the demand to provide the request processing history the first electronic device may: (i) read, from the second version of the request identifier, all the subsystem identifiers, and (ii) access data storages of respective subsystems to obtain information about request processing.

In some implementations of the first electronic device, the processor of the first electronic device is further configured such that responsive to receiving the demand to provide the request processing history, the first electronic device may: receive a most complete version of the request identifier, wherein, to obtain the most complete version of the request identifier, the first electronic device: receives from any one, selected from: (i) the log file of the distributed data processing network, and (ii) the common database, all versions of the request identifier being stored in a respective data storage and: responsive to more than one version of the request identifier is available, determines a version of the request identifier comprising maximum subsystem identifiers as the most complete version of the request identifier, and responsive to one version of the request identifier is available, determines this version of the request identifier as the most complete version of the request identifier, and read, from the most complete version of the request identifier, all subsystem identifiers comprising in the most complete version of the request identifier, and access data storages of respective subsystems for retrieving from them the information about request processing.

In some implementations of the first electronic device, the distributed data processing network comprises a third electronic device, the third electronic device being at least a part of a third subsystem, the third subsystem being at least a part of the distributed data processing network, and wherein the first electronic device receives the demand to provide the request processing history from the third electronic device.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smartphones, and tablets, as well as network equipment such as routers, switches, and gateways. It should be understood, that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

DETAILED DESCRIPTION

Figure 1:
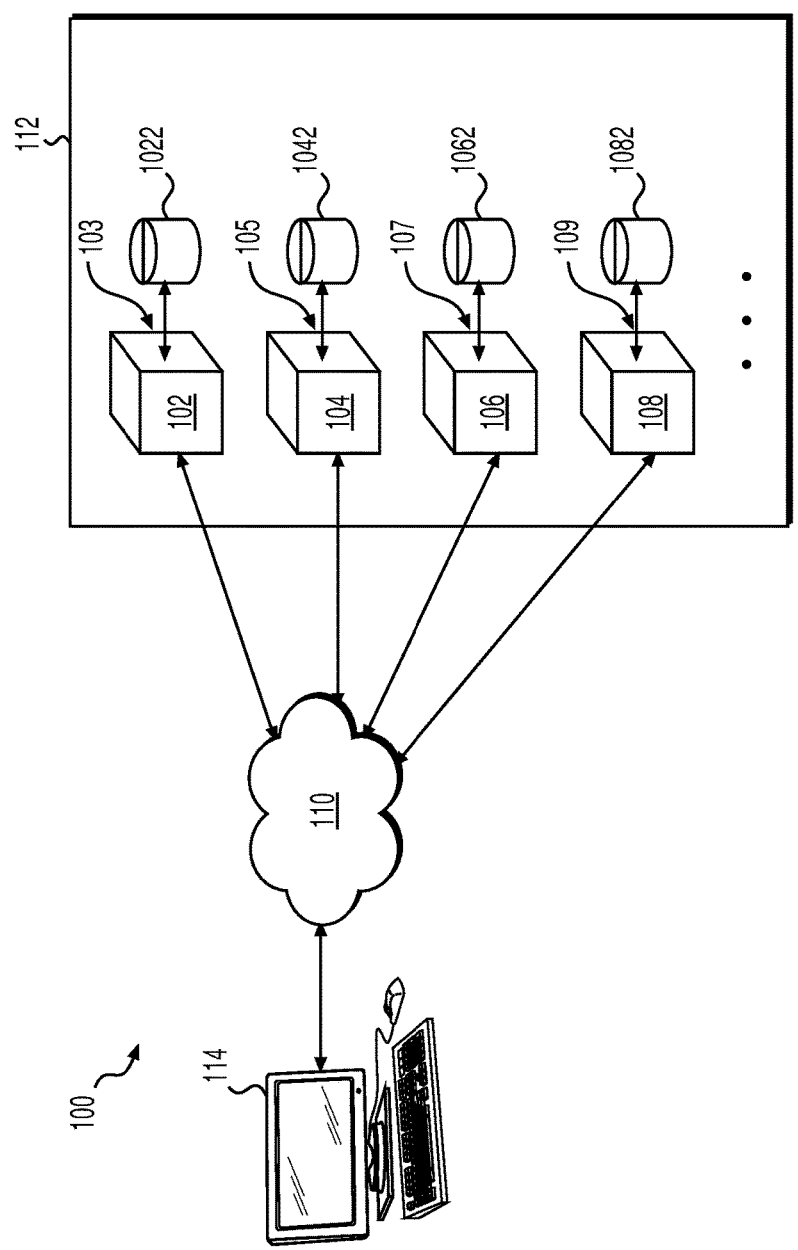
FIG. 1 is a schematic diagram depicting an implementation of a network computer system, the network computer system being implemented in accordance with non-limiting embodiments of the present technology.

Referring to FIG. 1, there is shown a diagram of a computer system 100, the computer system 100 being suitable for implementing non-limiting embodiments of the present technology. It is to be expressly understood that the computer system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the computer system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the computer system 100 may provide in certain instances simple implementations of the present technology, and that where such is the case they have been presented in this manner as an aid to understanding. As persons skilled in the art would understand, various implementations of the present technology may be of a greater complexity.

Figure 2:
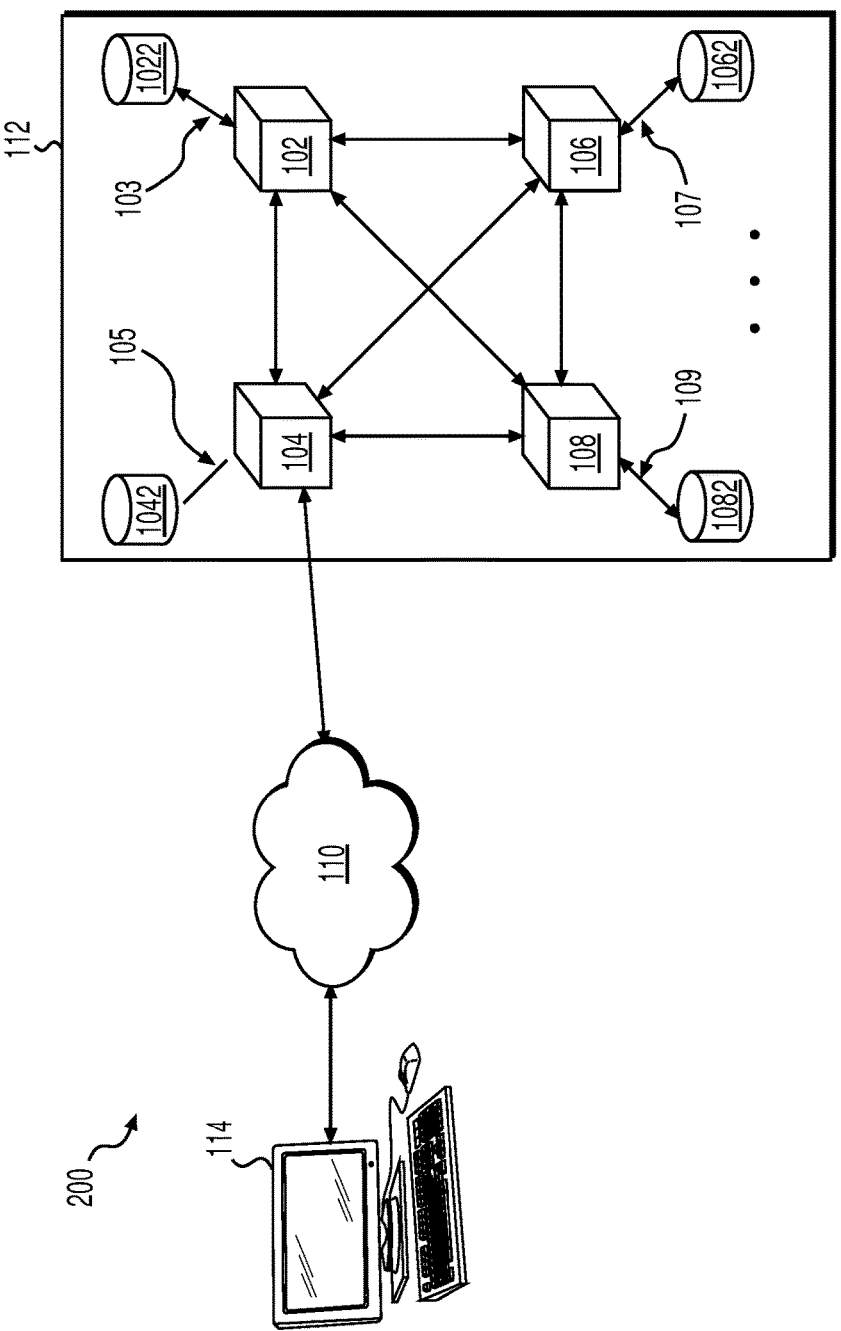
FIG. 2 is a schematic diagram depicting an alternative implementation of the network computer system, the network computer system being implemented in accordance with non-limiting embodiments of the present technology.

FIG. 2 depicts an alternative implementation 200 of the computer system 100.

Figure 3:
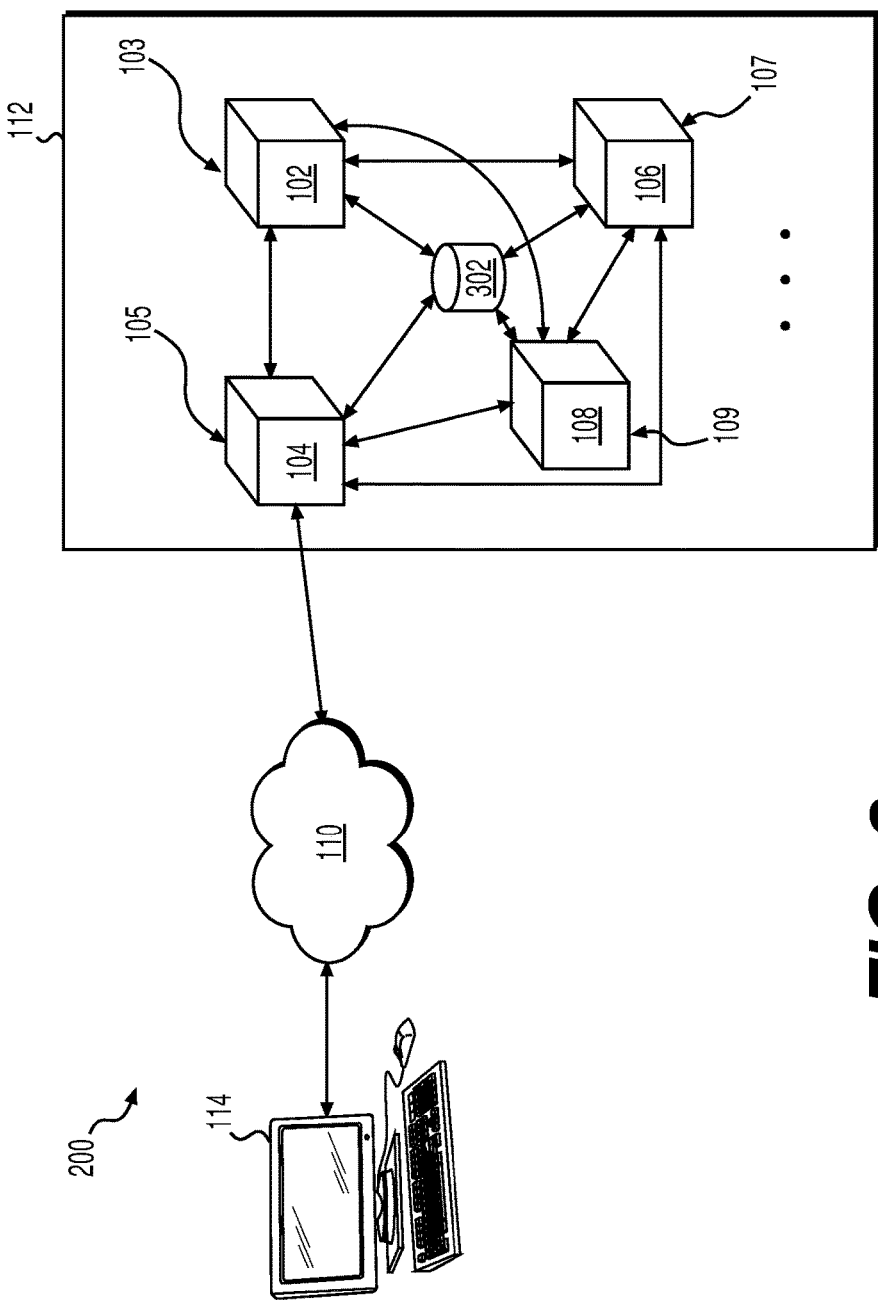
FIG. 3 is a schematic diagram depicting yet another alternative implementation of the network computer system, the network computer system being implemented in accordance with non-limiting embodiments of the present technology.

FIG. 3 depicts yet another alternative implementation 300 of the computer system 100.

In general, the description of FIG. 1 applies to the embodiment of FIG. 2, aside from the fact that in the alternative implementation 200 of the computer system 100, only the second electronic device 102 is connected to communication networks 110 while other electronic devices 104, 106, 108 are connected with each other and with the second electronic device 102 via a local communication network (connections are not numbered). Thus in such implementation 200 of the computer system 100 the second electronic device 102 can function as a front-end server while the other electronic devices 104, 106, 108 can function as back-end servers.

In general, the description of FIG. 1 applies to the embodiments of FIG. 3, aside from the fact that in the alternative implementation 300 of the computer system 100, only the second electronic device 102 is connected to the communication networks 110 while other electronic devices 104, 106, 108 are connected with each other and with the second electronic device 102 via a local communication network (connections are not numbered). Thus in such implementation 300 of the computer system 100 the second electronic device 102 can function as an front-end server while the other electronic devices 104, 106, 108 can function as back-end servers. An additional difference of the implementation 300 of the computer system 100 is the fact that, as it is schematically depicted in FIG. 3, functions of the data storages 1042, 1022, 1062 and 1082, depicted in FIG. 1 and FIG. 2 can be performed by a common data storage 302 as it will be described below.

The system 100 includes the second electronic device 102, the first electronic device 104, the third electronic device 106 and the fourth electronic device 108. The second electronic device 102, the first electronic device 104, the third electronic device 106 and the fourth electronic device 108 are components of a distributed data processing network 112. As those skilled in the art will appreciate, the number of components of the distributed data processing network 112 may vary: it can be four (as in this example), more than four, or less than four.

The second electronic device 102 can be a second subsystem 103 of the distributed data processing network 112. The second subsystem 103 can perform certain functions of a set of functions which set of functions is performed by the distributed data processing network 112 as a whole. Though the second subsystem 103 in this implementation of the present technology includes the second electronic device 102 only, it is not mandatory. In other implementations, the functions of the second subsystem 103 can be performed by a plurality of electronic devices, not only by the second electronic device 102. The second subsystem 103 has an identifier (not shown) of the second subsystem 103. As a non-limiting example the identifier of the second subsystem 103 can be an alphanumeric sequence (for example, as follows: ufo06d), however it is not mandatory. This identifier of the second subsystem 103 is unique within a plurality of subsystem identifiers in the distributed data processing network 112.

The first electronic device 104 can be a first subsystem 105 of the distributed data processing network 112. The first subsystem 105 can perform certain functions of a set of functions which set of functions is performed by the distributed data processing network 112 as a whole. Though the first subsystem 105 in this implementation of the present technology includes the first electronic device 104 only, it is not mandatory. In other implementations the functions of the first subsystem 105 can be performed by a plurality of electronic devices, not only by the first electronic device 104. The first subsystem 105 has an identifier (not shown) of the first subsystem 105. As a non-limiting example the identifier of the first subsystem 105 can be an alphanumeric sequence, however it is not mandatory. This identifier of the first subsystem 105 is unique within the plurality of subsystem identifiers in the distributed data processing network 112, the plurality includes the identifier of the second subsystem 103.

The third electronic device 106 can be a third subsystem 107 of the distributed data processing network 112. The third subsystem 107 can perform certain functions of a set of functions which set of functions is performed by the distributed data processing network 112 as a whole. Though the third subsystem 107 in this implementation of the present technology includes the third electronic device 106 only, it is not mandatory. In other implementations the functions of the third subsystem 107 can be performed by a plurality of electronic devices, not only by the third electronic device 106. The third subsystem 107 has an identifier (not shown) of the third subsystem 107. This identifier of the third subsystem 107 is unique within the plurality of subsystem identifiers in the distributed data processing network 112, the plurality includes the identifier of the second subsystem 103 and the identifier of the first subsystem 105.

The fourth electronic device 108 can be a fourth subsystem 109 of the distributed data processing network 112. The fourth subsystem 109 can perform certain functions of a set of functions which set of functions is performed by the distributed data processing network 112 as a whole. Though the fourth subsystem 109 in this implementation of the present technology includes the fourth electronic device 108 only, it is not mandatory. In other implementations the functions of the fourth subsystem 109 can be performed by a plurality of electronic devices, not only the fourth electronic device 108. The fourth subsystem 109 has an identifier (not shown) of the fourth subsystem 109. This identifier of the fourth subsystem 109 is unique within the plurality of subsystem identifiers in the distributed data processing network 112, the plurality includes the identifier of the second subsystem 103, the identifier of the first subsystem 105 and the identifier of the fourth subsystem 109.

Each electronic device 102, 104, 106 and 108 can be a conventional computer server. As an example the second electronic device 102, the first electronic device 104, the third electronic device 106 and the fourth electronic device 108 can be implemented as a Dell™ PowerEdge™ server, running the Microsoft™ Windows Server™ operating system. Needless to say, the second electronic device 102 and/or the first electronic device 104 and/or the third electronic device 106 and/or the fourth electronic device 108 can be implemented as any other suitable hardware and/or software and/or firmware or a combination thereof. In this non-limiting implementation of the present technology, each of mentioned above electronic devices is a single server. In other non-limiting implementations, the functionality of the second electronic device 102 and/or the first electronic device 104 and/or the third electronic device 106 and/or the fourth electronic device 108 can be divided and can be performed by several servers.

In some implementations, the second electronic device 102, the first electronic device 104, the third electronic device 106, and the fourth electronic device 108, or only some of them, are under control and/or operation of a cloud storage service provider, such as, for example, Yandex.Disk™. Yandex.Disk™ is a cloud service which is provided and managed by Yandex and which allows users to store their data on servers in a "cloud", and to transmit them to other users over the Internet. Cloud storage is a model of an on-line storage, in which data are stored on a plurality of distributed in a network servers, usually provided to clients for usage by a third party entity. Unlike a situation where data is stored by a client on his or her own (owned or leased) designated severs, a number of servers or their internal structure are invisible for the client. Data are stored and processed in a so-called "cloud" which is, from the client's point of view, a large single virtual server. Physically such servers can be located apart; they can even be located on different continents. The Yandex.Disk™ service is based on data synchronization on various devices. Earlier, before launching Yandex.Disk™ service, Yandex.Narod™ stored client files.

The second electronic device 102, the first electronic device 104, the third electronic device 106 and the fourth electronic device 108 include storage media (not shown). Technically the storage media can be storage media of any nature and kind whatsoever, including RAM, ROM, disks (CD-ROMs, DVDs, floppy disks, hard drivers, etc.), USB keys, solid state-drives, tape drives and the like and combination thereof.

Implementations of the second electronic device 102, the first electronic device 104, the third electronic device 106 and the fourth electronic device 108 are well known in the art. So, suffice it to state, that each of the devices 102, 104, 106 and 108 comprises inter alia a network communication interface (such as a modem, a network card and the like) (not depicted) for two-way communication over the communication networks 110; and processors (not depicted) coupled to the network communication interface, the processors being configured to execute various routines, including those described herein below. To that end the processors may store or have access to computer readable instructions which instructions, when executed, cause the processors to execute the various routines described herein.

The storage media of the electronic devices 102, 104, 106 and 108 are intended to store data, including computer readable instructions, which computer readable instructions can initiate electronic devices 102, 104, 106 and 108 to perform steps of the method 400 and/or the method 500.

The storage media of the electronic devices 102, 104, 106 and 108 are also intended to store computer readable instructions, which computer readable instructions provide communication between all or some of the electronic devices 102, 104, 106 and 108, as well as with client devices, for example, with a client device 114.

The second electronic device 102, the first electronic device 104, the third electronic device 106 and the fourth electronic device 108 are coupled to communication networks 110 via communication links (not numbered). In some non-limited implementations, the communication networks 110 can be implemented as the Internet. In other implementations, the communication networks 110 can alternatively be implemented as a wide area network or local area network, private network, and the like. For example, as it is shown in FIG. 1, all the electronic devices 102, 104, 106 and 108 are coupled with each other and with the client device 114 over the communication networks 110, which communication networks 110 is implemented in this case as the Internet. In alternative implementations of the present technology, as it is shown in FIG. 2 and FIG. 3, only the second electronic device 102 is connected to the communication networks 110, which communication networks 110 is implemented as the Internet in these implementations. Thus, in these implementations of the present technology, only the second electronic device 102 can receive requests from the client device 114 over the communication networks 110. And the electronic devices 102, 104, 106 and 108 are interconnected over the local communication network (the interconnections are not numbered). Thus in such implementations of the present technology, the second electronic device 102 can perform functions of a front-end server, while the other electronic devices 104, 106, 108 can perform functions of back-end servers.

In implementations of the present technology, in general, how the communication links are implemented is not particularly limited and it depends on which devices are coupled to the communication networks 110. As a non-limited example, a connection of the electronic devices 102, 104, 106 and 108 to the communication networks 110 can be performed using wire communications (Ethernet-based connection). At the same time, other electronic devices could be also connected in other ways. For example, the connection can be implemented as a wireless communication network (such as but not limited to, a 3G communications network link, 4G communications network link, Wireless Fidelity, or WiFi® for short, Bluetooth® and the like) or the communication link can be wireless as well as wire (Ethernet-based connection).

It should be expressly understood that various implementations of the electronic devices 102, 104, 106 and 108, the communication links for the connection to the communication networks 110, the communication links for the connection to the local networks are provided for illustration purposes only. Thus, those skilled in the art will appreciate other possible implementations of the electronic devices 102, 104, 106 and 108, and of the communication links for the connection to the communication networks 110. Thus, by no means, examples provided herein above are meant to limit the scope of the present technology.

In some implementations, the computer readable instructions, stored on the storage media of the electronic devices 102, 104, 106, and 108 provide intercommunication of all or some of the electronic devices 102, 104, 106 and 108 but do not provide their communication with external client devices.

The computer readable instructions can also provide receiving, by the electronic devices 102, 104, 106 and 108, requests from client devices, for example, from the client device 114, for further processing.

In some implementations of the present technology, the computer readable instructions further or alternatively can provide generating, by all or some of the electronic devices 102, 104, 106 and 108, requests for further processing. In this case, corresponding all or some of the electronic devices 102, 104, 106 and 108 can be client devices for other electronic devices.

The computer readable instructions can also provide processing, by the electronic devices 102, 104, 106 and 108, requests which were received from client devices, for example, from the client device 114, or which were generated by one or some of the electronic devices 102, 104, 106 and 108.

The computer readable instructions of the electronic devices 102, 104, 106 and 108 can provide sequential (distributed) request processing, when the request processing is performed by two or more electronic devices. For example, the second electronic device 102 can generate a request and send it to the third electronic device 106 for processing. Then the third electronic device 106 can re-send the processed request to the fourth electronic device 108 for further processing. Then the fourth electronic device 108 can, in turn, process the request, which has been processed by the third electronic device 106, and send it to the first electronic device 104 for further processing. As we can see in this example, all the electronic devices 102, 104, 106 and 108 in the distributed data processing network 112 can participate in request processing, but it is not required for all requests and/or all implementations of the present technology.

As an alternative example, the second electronic device 102 can receive the request generated by the client device 114 from the client device, process it and send the processed request to the fourth electronic device 108 for further processing. Then the fourth electronic device 108 can process the request and re-send the request which has been processed by the electronic devices 102 and 108 to the first electronic device 104 for further processing. Then the first electronic device 104 can, in turn, process the request, which has been processed by the electronic devices 102 and 108, and send the information about results of request processing to the client device 114. As we can see in this alternative example, some electronic devices (102, 104 and 108) can participate in request processing, and some electronic devices may not participate in request processing (for example, in this case, the third electronic device 106).

In some implementations of the present technology, the computer readable instructions can provide generating by all or some of the electronic devices 102, 104, 106 and 108 unique invariable parts of request identifiers. In the first example discussed above, the second electronic device 102, after generating the request, can also generate a unique invariable part of a request identifier. In the second (alternative) example discussed above, the second electronic device 102, after receiving a request from the client device 114, can also generate a unique invariable part of the request identifier. Various subsystems 103, 105, 107 and/or 109 of the distributed data processing network 112 can further use the unique invariable parts of the request identifier which was generated in a way described above, for identifying the same request by the different subsystems 103, 105, 107 and/or 109 as the same request.

In this implementation of the present technology, the unique invariable part of the request identifier is an alphanumeric sequence which is unique among other request identifiers in the distributed data processing network 112. In the alternative implementations of the present technology the unique invariable part of the request identifier can be an alphanumeric sequence, a digit sequence, a sequence of special characters and a combination of letters and/or special characters and/or digits.

In some implementations of the present technology, the computer readable instructions can provide generating, by all or some of the electronic devices 102, 104, 106 and 108, various versions of request identifiers. The first version of the request identifier can be generated by the electronic device which has generated the request or by the electronic device which has directly received the request from outside of the distributed data processing system 112, for example, from the client device 114. Each version of the request identifier includes a unique invariable part of the request identifier which allows all the subsystems 103, 105, 107 and 109 of the distributed data processing network 112 to identify this request and also can include one or more subsystem identifiers of subsystem(s) which has (have) processed this request. Receiving and re-sending request also may be deemed as request processing. Thus, the first version of the request identifier can be generated either by the electronic device which has generated the request or by the electronic device which has directly received the request out of the distributed data processing system 112, for example, from the client device 114. In both of the previous examples such a device is the second electronic device 102. Thus, the first version of the request identifier can include the unique invariable part of the request identifier and an identifier of the second subsystem 103. During further re-sending the request to other electronic devices, following electronic devices can generate the second, third etc. versions of the request identifier. The second and the following versions of the request identifier can be produced by adding identifiers of corresponding subsystems by the corresponding electronic devices. Thus, each next version of the request identifier can be longer than previous as it is generated by adding the identifier of the corresponding subsystem to the previous version of the request identifier which includes identifiers of other subsystem which have already processed this request. It should be noted that in some alternative implementations of the present technology some electronic devices which have processed the request may not change the previous version of the request identifier and keep it the same. In other alternative implementations of the present technology some electronic devices which have processed the request can alternatively or further generate another version of the request identifier by removing from the previous version of the request identifier at least an identifier of one subsystem which has processed the request. Thus, the request processing history can be changed.

The second electronic device 102, the first electronic device 104, the third electronic device 106 and the fourth electronic device 108 include, as it is shown in FIG. 1 and FIG. 2, the data storages 1042, 1022, 1062, and 1082, or they are associated with the data storages 1042, 1022, 1062, and 1082. In some implementations of the present technology, the data storages 1042, 1022, 1062 and 1082 can be implemented as log-files of the corresponding subsystems. For example, the second data storage 1022 can be implemented as a log-file of the second subsystem 103. The first data storage 1042 can be implemented as a log-file of the first subsystem 105. The third data storage 1062 can be implemented as a log-file of the third subsystem 107. The fourth data storage 1082 can be implemented as a log-file of the fourth subsystem 109. In alternative implementations of the present technology, those storages can be implemented as databases being parts of corresponding subsystems. For example, the second data storage 1022 can be implemented as a database of the second subsystem 103. The first data storage 1042 can be implemented as a database of the first subsystem 105. The third data storage 1062 can be implemented as a database of the third subsystem 107. The fourth data storage 1082 can be implemented as a database of the fourth subsystem 109.

The computer readable instructions stored on the storage media of the second electronic device 102, the first electronic device 104, the third electronic device 106 and the fourth electronic device 108 also provide storing, by the electronic devices 102, 104, 106 and 108, information about received and/or processed requests correspondingly in the data storages 1042, 1022, 1062 and 1082.

The computer readable instructions also can provide storing different versions of request identifiers by the electronic devices 102, 104, 106 and 108 in the data storages 1042, 1022, 1062 and 1082. Each version of the request identifier can include a unique invariable part of the request identifier and at least some subsystem identifiers, which subsystems have processed this request before the given electronic device received this request. For example, the second electronic device 102 received a request from the client device 114, and the request was sequentially processed by the first electronic device 104, then by the third electronic device 106, and then by the fourth electronic device 108. In this case, the second data storage 1022 can provide storing a first version of the request identifier, which the first version of the request identifier can include a unique invariable part of the request identifier and an identifier of the second subsystem 103. The first data storage 1042 can provide storing a second version of the request identifier, which the second version of the request identifier can include the unique invariable part of the request identifier, the identifier of the second subsystem 103 and an identifier of the first subsystem 105. The third data storage 1062 can provide storing a third version of the request identifier, which the third version of the request identifier can include the unique invariable part of the request identifier, the identifier of the second subsystem 103, the identifier of the first subsystem 105 and an identifier of the third subsystem 107. The fourth data storage 1082 can provide storing a fourth version of the request identifier, which the fourth version of the request identifier can include the unique invariable part of the request identifier, the identifier of the second subsystem 103, the identifier of the first subsystem 105, the identifier of the third subsystem 107, and the identifier of the fourth subsystem 109.

The computer readable instructions also can provide possibility to read the data from the data storages 1042, 1022, 1062 and 1082 by the electronic devices 102, 104, 106 and 108.

The data storages 1042, 1022, 1062 and 1082 can be parts of the electronic devices 102, 104, 106 and 108 correspondingly.

In alternative implementations of the present technology, as it is shown schematically in FIG. 3, functions of the data storages 1042, 1022, 1062, and 1082 can be performed by a single data storage 302. The single data storage 302 can be implemented as a log-file of the distributed data processing network 112. The electronic devices 102, 104, 106 and 108 can record the information, which in the implementation described above they would record into the data storages 1042, 1022, 1062 and 1082, into the single data storage 302. For example, the information about received and/or processed requests, about the various versions of the request identifiers and the like can be stored into the single data storage 302. The electronic devices 102, 104, 106 and 108 can also read the information being stored in the single data storage 302.

In another alternative implementation of the present technology the single data storage 302 can be implemented as a common database which can be accessed by all or some of the electronic devices 102, 104, 106 and 108; the electronic devices 102, 104, 106 and 108 can record the information, which in the implementation described above they would record into the data storages 1042, 1022, 1062 and 1082, into the single data storage 302. For example, the information about received and/or processed requests, the various versions of the request identifiers and the like can be stored into the single data storage 302. The electronic devices 102, 104, 106 and 108 can also read the information being stored in the single data storage 302.

As shown schematically in FIG. 1 and FIG. 2, the second electronic device 102 is connected via the communication networks 110 to the client device 114. The client device 114 is typically associated with a user (not shown). The user may be a person which is interested in services provided by the distributed data processing network 112. For example, the user can be interested in services provided by the Yandex.Disk™ cloud storage.

It should be noted that the fact that the client device 114 is associated with the user does not need to suggest or imply any mode of operation—such as a need to log in, a need to be registered or the like.

The implementation of the client device 114 is not particularly limited, but as an example, the client device 114 may be implemented as a personal computer (desktops, laptops, netbooks, etc.), a wireless communication device (a cell phone, a smartphone, a tablet and the like), as well as network equipment (a router, a switch, or a gateway).

Depicted in FIG. 1 and FIG. 2 and FIG. 3 the client device 114 is implemented as Dell™ Precision T1700 MT CA033PT170011RUWS PC with Intel® Xeon™ processor, CPU frequency: 3300 MHz, video card nVIDIA Quadro K2000, running the Windows 7 Pro 64-bit operating system, the operating system installed and active. However, as those skilled in the art will understand, the implementation of the client device 114 is not particularly limited. The client device 114 may be implemented as a personal computer (desktops, laptops, netbooks, etc.), a wireless communication device (a cell phone, a smartphone, a tablet and the like), as well as other equipment. The client device 114 includes the storage media (not depicted) implemented as a hard drive with 500 Gb memory. However, as those skilled in the art will understand, the storage media can be implemented as storage media of any nature and kind whatsoever, including RAM, ROM, disks (CD-ROMs, DVDs, floppy disks, hard drivers, etc.), USB keys, solid state-drives, tape drives, etc. and combination thereof. The storage media can store user's files and program instructions. More specifically, the storage media can store software which execute functions of a browser (not depicted). In general, the purpose of the browser is to enable the user to connect to the electronic devices of the distributed data processing network 112.

In the implementation of the present technology which is shown schematically in FIG. 1, the client device 114 can connect to any electronic device 102, 104, 106 and 108. In alternative implementations of the present technology which is shown schematically in FIG. 2 and FIG. 3 the the client device 114 can connect over the communication networks 110 to the second electronic device 102 only. Connection to one of the electronic devices included in the distributed data processing network 112 can allow the user to use certain services provided by the distributed data processing system 112. For example, the user can upload user's files into the cloud storage over the communication networks 110 using the browser installed on his client device 114 and connecting to the second electronic device 102 for this purpose.

In the client device 114, the browser is implemented as Yandex™ browser. However, as those skilled in the art will understand, the implementation of the browser is not particularly limited. As non-limiting examples, such browsers can be Google Chrome™, Internet Explorer™, and the like. It should be expressly understood that any other commercially available or proprietary application may be used for implementing non-limiting embodiments of the present technology.

The client device 114 includes also the display (not numbered) implemented as a 21.5" Dell™ E2214H 2214-7803, 1920×1080 screen resolution, which can provide video information to the user. Thus the user has a possibility to see on a screen of the client device 114 in the browser interface various objects, for example a file select menu for uploading.

Figure 4:
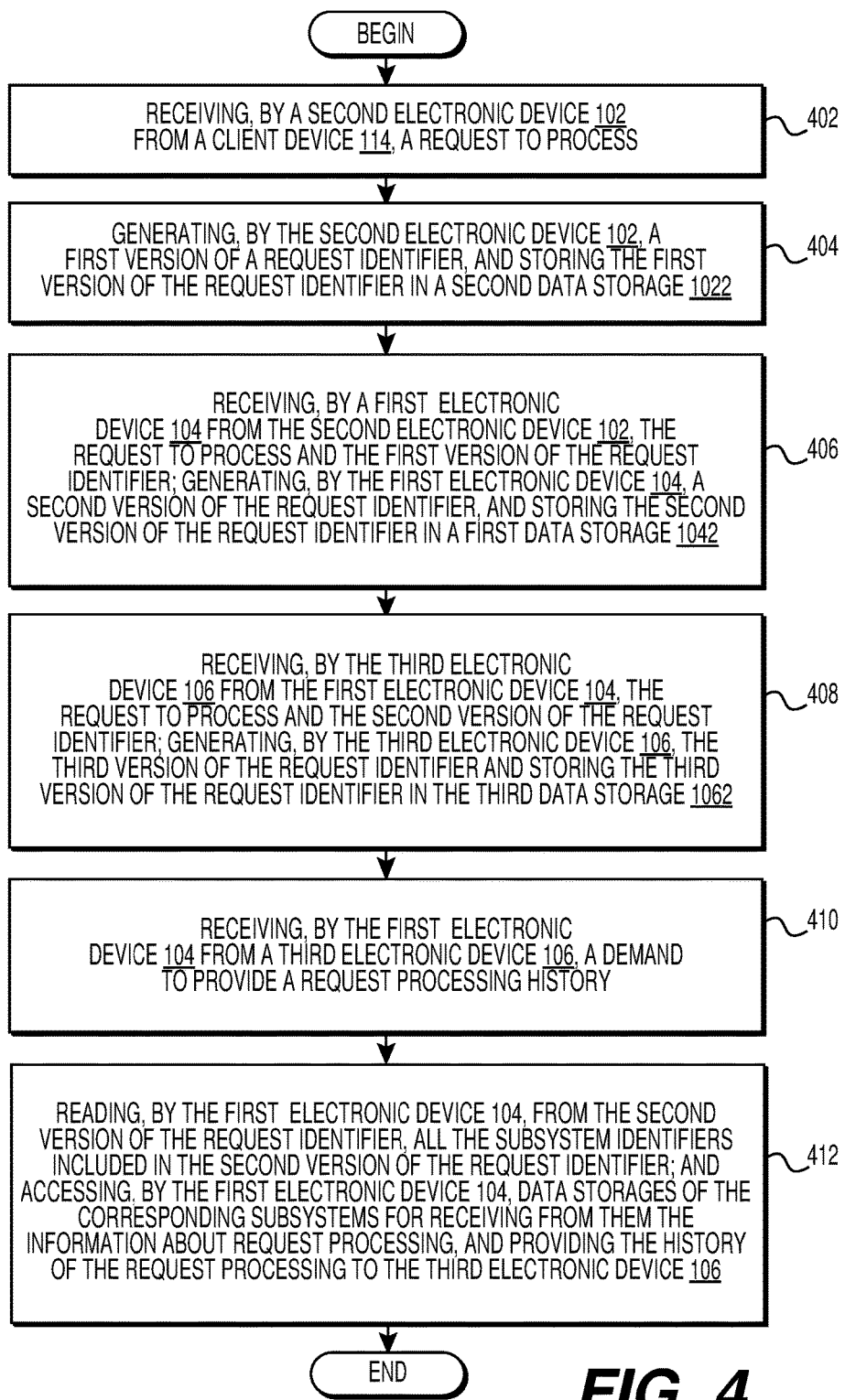
FIG. 4 is the schematic flowchart of a method being executed on the first electronic device 102 in accordance with non-limiting implementations of the present technology.

FIG. 4 is a block-diagram of a method 400, the method being executed on the first electronic device 104 of FIG. 1 in accordance with non-limiting implementations of the present technology.

The method 400 is a computer-implemented method of processing a request. The method 400 is executed on the first electronic device 104, connected to the second electronic device 102, the second electronic device 102 being at least a part of the second subsystem 103, the first electronic device 104 being at least a part of the first subsystem 105, the second subsystem 103 and the first subsystem 105 are at least a part of the distributed data processing network 112; the first electronic device 104 and the second electronic device 102 have the identifier of the first subsystem 105 and the identifier of the second subsystem 103 correspondingly associated with them. In the given example the distributed data processing network 112 performs the Yandex.Disk™ cloud service.

In implementation of the present technology the method 400 can be performed in the distributed data processing network 112 on the first electronic device 104 of FIG. 1. For this purpose the first electronic device 104 includes the storage media which stores computer-readable instructions which, when executed, cause the first electronic device 104 to execute steps of the method 400. However, as those skilled in the art would understand, the method 400 can be executed on other electronic devices.

Step 402—receiving, by the second electronic device 102 from the client device 114, a request to process The method 400 begins at step 402, where the second electronic device 102 receives, from the client device 114 a request to upload a user's file into Yandex.Disk™ cloud storage. For this purpose, the user starts a web-browser session on the client device 114 and connects to the Yandex.Disk™ service using the web-interface. The user actuates the "upload" button on the screen of the client electronic device and selects a file to upload. The browser of the client device 114 sends the corresponding request to the second electronic device 102.

In this implementation of the present technology, the request is transmitted using HTTP protocol.

Then, the method 400 proceeds to step 404.

Step 404—generating, by the second electronic device 102, the first version of a request identifier, and storing the first version of the request identifier in the second data storage 1022.

At step 404 the second electronic device 102 generates the first version of a request identifier. The first version of the request identifier is generated using a unique invariable part of the request identifier and an identifier of the second subsystem 103.

The second electronic device 102, which has received the request, then checks if the unique invariable part of the request identifier was received from the client device 114. If there is no invariable part of the request identifier (which can be recognized by the distributed data processing network 112) in headers of the request (which was received in HTTP-format) the second electronic device 102 generates it:

Yandex-Cloud-Request-ID: web-78c1ad63af08ce9cab03346c14d4728d-ufo06d

Then the second electronic device 102 generates the first version of the request identifier by adding the identifier of the second subsystem 103 to the invariable part of the request identifier:

Yandex-Cloud-Request-PATH: ufo06d

Thus, the second electronic device 102 has generated the first version of the request identifier as follows:

Yandex-Cloud-Request-ID: web-78c1ad63af08ce9cab03346c14d4728d-ufo06d

Yandex-Cloud-Request-PATH: ufo06d

The second electronic device 102 stores the first version of the request identifier in the second data storage 1022, which the second data storage 1022 is implemented as a log-file of the second subsystem 103 in this implementation. Along with the first version of the request identifier, the second electronic device 102 can store in the second data storage 1022 the request itself and the information associated with this request, for example, the information about processing this request by the second electronic device 102. The second electronic device 102 can also write the invariable part of the request identifier into the header of the request.

The method 400 then proceeds to step 406.

Step 406—receiving, by the first electronic device 104 from the second electronic device 102, the request to process and the first version of the request identifier; generating, by the first electronic device 104, the second version of the request identifier, and storing the second version of the request identifier in the first data storage 1042

At step 406 the second electronic device 102 requests the "core" component of the distributed data processing network 112 for a link for uploading the user's file from the client device 114 (for example, in this implementation of the present technology, the "core" component of the distributed data processing network 112 is implemented as the first electronic device 104). For this purpose, the second electronic device 102 sends, and the first electronic device receives a request and the first version of the request identifier, which the first version of the request identifier was generated by the second electronic device 102.

The first electronic device 104, having received the request, checks then if the unique invariable part of the request identifier was received from the second electronic device 102. Having determined that headers of the request, the request being in the HTML, format, comprise the unique invariable part of the request identifier, the unique invariable part of the request identifier being recognized as such by the distributed data processing network 112, the first electronic device 104 keeps the request identifier non-changed:

Yandex-Cloud-Request-ID: web-78c1ad63af08ce9cab03346c14d4728d-ufo06d

Then the first electronic device 104 generates the second version of the request identifier by adding the identifier of the first subsystem 105 to the invariable part of the request identifier:

Yandex-Cloud-Request-PATH: mpfs13h

Thus, the first electronic device 104 has generated the second version of the request identifier as follows:

Yandex-Cloud-Request-ID: web-78c1ad63af08ce9cab03346c14d4728d-ufo06d

Yandex-Cloud-Request-PATH: ufo06d mpfs13h

The first electronic device 104 stores the second version of the request identifier in the first data storage 1042, which the first data storage 1042 is implemented as a log-file of the first subsystem 105 in this implementation. Along with the second version of the request identifier, the first electronic device 104 can store, in the first data storage 1042, the request itself and the information associated with this request, for example, the information about processing this request by the first electronic device 104.

The method 400 then proceeds to step 408.

Step 408—receiving, by the third electronic device 106 from the first electronic device 104, the request to process and the second version of the request identifier; generating, by the third electronic device 106, the third version of the request identifier and storing the third version of the request identifier in the third data storage 1062

At step 408 the first electronic device 104 requests the "storage" component of the distributed data processing network 112 for the information about a place where the user's file has to be stored (for example, in this implementation of the present technology the "storage" component of the distributed data processing network 112 is implemented as the third electronic device 106). For this purpose the first electronic device 104 sends and the third electronic device receives a request and the second version of the request identifier which was generated by the first electronic device 104.

The third electronic device 106 which has received the request then checks if the unique invariable part of the request identifier was received from the first electronic device 104. Having determined that headers of the request, the request being in the HTML, format, comprise the unique invariable part of the request identifier, the unique invariable part of the request identifier being recognized as such by the distributed data processing network 112, the third electronic device 106 keeps the request identifier non-changed:

Yandex-Cloud-Request-ID: web-78c1ad63af08ce9cab03346c14d4728d-ufo06d

Then the third electronic device 106 generates the third version of the request identifier by adding the identifier of the third subsystem 107 to the invariable part of the request identifier:

Yandex-Cloud-Request-PATH: kladun01g

Thus, the third electronic device 106 has generated the third version of the request identifier as follows:

Yandex-Cloud-Request-ID: web-78c1ad63af08ce9cab03346c14d4728d-ufo06d

Yandex-Cloud-Request-PATH: ufo06d mpfs13h kladun01g

The third electronic device 106 stores the third version of the request identifier in the third data storage 1062, which the third data storage 1062 is implemented as a log-file of the third subsystem 107 in this implementation. Along with the third version of the request identifier, the third electronic device 106 can store, in the third data storage 1062, the request itself and the information associated with this request, for example, the information about processing this request by the first electronic device 104.

The method 400 then proceeds to step 410.

Step 410—receiving, by the first electronic device 104 from the third electronic device 106, a demand to provide a request processing history At step 410, the third electronic device 106 can determine an error which prevents performing a required operation, or which allows performing the operation incorrectly. Thus, there may be a need in receiving, by the third electronic device 106, the request processing history. As those skilled in the art will understand, the need in receiving the request processing history can be induced by other reasons. This example of determining an error is merely a non-limiting illustrative example. Moreover, functions of the third electronic device 106 which concern determining error reasons can be performed by other electronic devices, including dedicated devices.

To receive the request processing history, the third electronic device 106 addresses the electronic device, from which the request was received, i.e. the first electronic device 104 in this example, to obtain the request processing history. The first electronic device 104 receives such a demand from the third electronic device 106.

The method 400 then proceeds to step 412.

Step 412—reading, by the first electronic device 104, from the second version of the request identifier, all the subsystem identifiers included in the second version of the request identifier, and accessing, by the first electronic device 104, data storages of the corresponding subsystems for receiving from them the information about request processing, and providing the history of the request processing to the third electronic device 106

At step 412 the first electronic device 104 reads from the second version of the request identifier all the subsystem identifiers included in the second version of the request identifier.

As it was described above at step 406, the first electronic device 104 has generated the second version of the request identifier as follows:

Yandex-Cloud-Request-ID: web-78c1ad63af08ce9cab03346c14d4728d-ufo06d

Yandex-Cloud-Request-PATH: ufo06d mpfs13h

Further, at step 406, the first electronic device 104 have stored the second version of the request identifier in the first data storage 1042, which the first data storage 1042 is implemented as a log-file of the first subsystem 105 in this implementation. Along with the second version of the request identifier, the first electronic device 104 have stored, in the first data storage 1042, the request itself and the information associated with this request, specifically, the information about processing this request by the first electronic device 104.

The first electronic device 104 reads all the subsystem identifiers from the second version of the request identifier, namely: ufo06d and mpfs13h. The identifier "ufo06d" is the identifier of the second subsystem 103 and the identifier "mpfs13h" is the identifier of the first subsystem 105. Thus, the first electronic device 104 access the second data storage 1022 of the second subsystem 103 via the second electronic device 102, and also access the first data storage 1042 of the first subsystem 105 to obtain the information about request processing. The first electronic device 104 does not access the fourth data storage 1082 of the second subsystem 109 because the second version of the request identifier does not contain the identifier of the fourth subsystem 109. Thus, implementations of the present technology allow saving processing power by avoiding screening all the subsystems of the distributed data processing network 112, only accessing the data storages which are parts or connected to electronic devices being parts of particular subsystems.

The first electronic device 104 receives from the data storages 1022 and 1042 the information associated with the request, specifically, the information about processing this request by the second electronic device 102 and the first electronic device 104. Then the first electronic device 104 provides this information to the third electronic device 106.

The method 400 then terminates.

Figure 5:
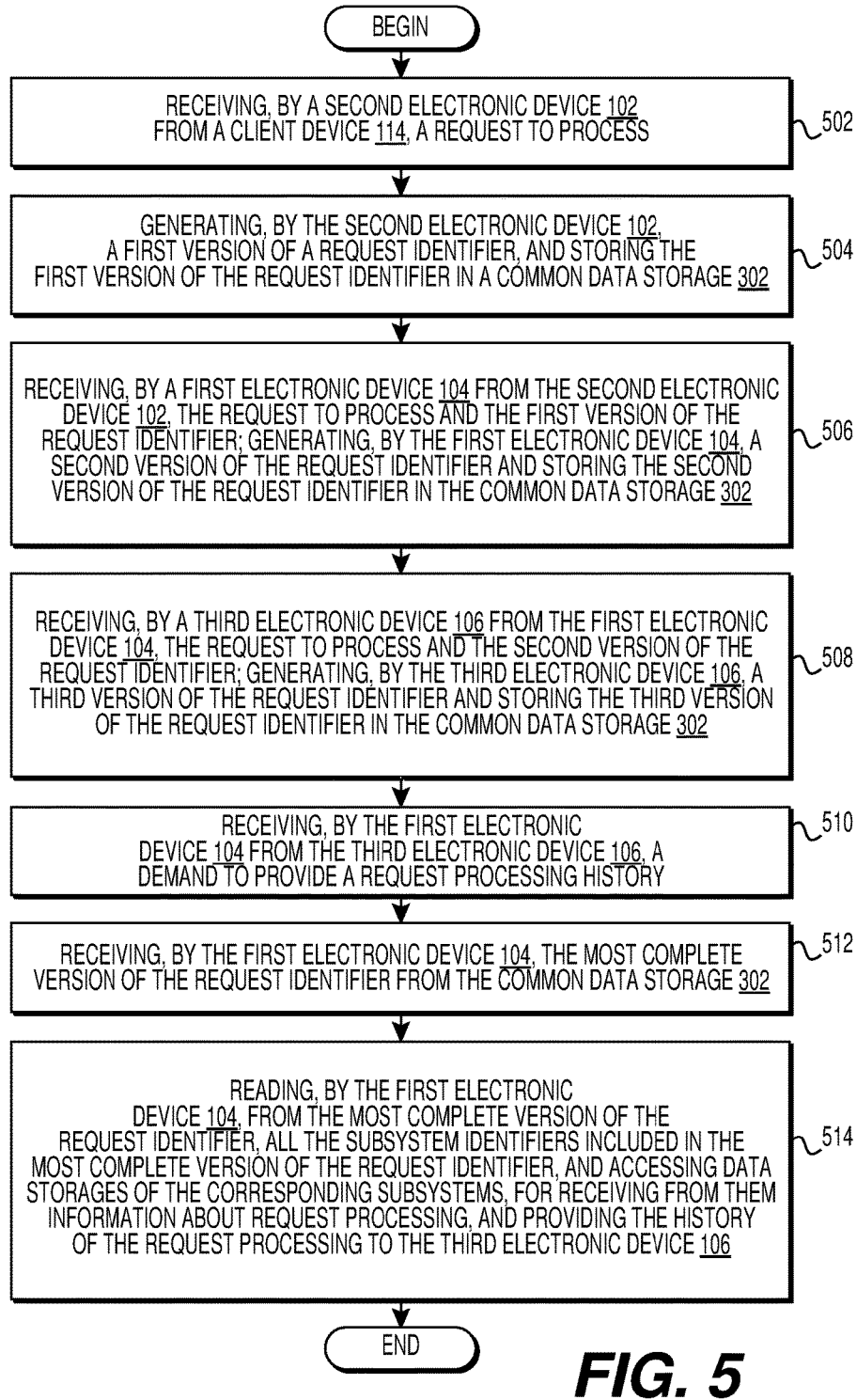
FIG. 5 is the schematic flowchart of a method being executed on the first electronic device 102, the method being executed in accordance with alternative non-limiting implementations of the present technology.

FIG. 5 is a block-diagram of a method 500, the method 500 being executed on the first electronic device 104 of FIG. 3 in accordance with non-limiting implementations of the present technology.

The method 500 is a computer-implemented method of processing a request. The method 500 is executed on the first electronic device 104, connected to the second electronic device 102, the second electronic device 102 being at least a part of the second subsystem 103; the first electronic device 104 being at least a part of the first subsystem 105, the second subsystem 103 and the first subsystem 105 are at least a part of the distributed data processing network 112; the first electronic device 104 and the second electronic device 102 have the identifier of the first subsystem 105 and the identifier of the second subsystem 103 associated with them correspondingly. In the given example the distributed data processing system 112 performs Yandex.Disk™ cloud service.

The main difference between the method 500 and the method 400 is the absence of the data storages 1042, 1022, 1062 and 1082 being parts of or connected to electronic devices 102, 104, 106, and 108, in the distributed data processing network 112. In this implementation of the present technology, functions of the data storages 1042, 1022, 1062, and 1082 are performed by a single central common data storage, the common data storage being implemented as a database, which database includes data recorded in there by different electronic devices being parts of different subsystems (the common database).

In implementation of the present technology, the method 500 can be performed in the distributed data processing network 112 on the first electronic device 104 of FIG. 3. For this purpose, the first electronic device 104 includes the storage media which stores computer-readable instructions, which computer-readable instructions, when executed, cause the first electronic device 104 to execute the steps of the method 500. However, as those who skilled in the art would understand, the method 500 can be executed on other electronic devices.

Step 502—receiving, by the second electronic device 102 from the client device 114, a request to process The method 500 begins at step 502, where the second electronic device 102 receives, from the client device 114, a request to upload a user's file into Yandex.Disk™ cloud storage. For this purpose, the user starts a web-browser session on the client device 114 and connects to the Yandex.Disk™ service using the web-interface. The user actuates the "upload" button on the screen of the client electronic device and selects a file to upload. The browser of the client device 114 sends the corresponding request to the second electronic device 102.

In this implementation of the present technology the request is transmitted using HTTP protocol.

Then, the method 500 proceeds to step 504.

Step 504—generating, by the second electronic device 102, a first version of a request identifier, and storing the first version of the request identifier in the common data storage 302

At step 504 the second electronic device generates a first version of a request identifier. The first version of the request identifier is generated from a unique invariable part of the request identifier and an identifier of the second subsystem 103.

The second electronic device 102 which has received the request then checks if the unique invariable part of the request identifier was received from the client device 114. If there is no invariable part of the request identifier (which can be recognized by the distributed data processing network 112) in headers of the request (which was received in the HTTP-format) the second electronic device generates it:

Yandex-Cloud-Request-ID: web-78c1ad63af08ce9cab03346c14d4728d-ufo06d

Then the second electronic device 102 generates the first version of the request identifier by adding the identifier of the second subsystem 103 to the invariable part of the request identifier:

Yandex-Cloud-Request-PATH: ufo06d

Thus, the second electronic device 102 has generated the first version of the request identifier as follows:

Yandex-Cloud-Request-ID: web-78c1ad63af08ce9cab03346c14d4728d-ufo06d

Yandex-Cloud-Request-PATH: ufo06d

The second electronic device 102 stores the first version of the request identifier in the common data storage 302 which is implemented as a common database in this implementation. Along with the first version of the request identifier the second electronic device 102 can store in the common data storage 302 the request itself and the information associated with this request, for example, the information about processing this request by the second electronic device 102.

The method 500 then proceeds to step 506.

Step 506—receiving, by the first electronic device 104 from the second electronic device 102, the request to process and the first version of the request identifier; generating, by the first electronic device 104, the second version of the request identifier and storing the second version of the request identifier in the common data storage 302

At step 506, the second electronic device 102 requests the "core" component of the distributed data processing network 112 for a link for uploading the user's file from the client device 114 (in this implementation of the present technology the "core" component of the distributed data processing network 112 is implemented as the first electronic device 104). For this purpose the second electronic device 102 sends and the first electronic device 104 receives a request and the first version of the request identifier, which the first version of the request identifier was generated by the second electronic device 102.

The first electronic device 104 which has received the request then checks if the unique invariable part of the request identifier was received from the second electronic device 102. Having determined that headers of the request, the request being in the HTML, format, comprise the unique invariable part of the request identifier, the unique invariable part of the request identifier being recognized as such by the distributed data processing network 112, the first electronic device 104 keeps the request identifier non-changed:

Yandex-Cloud-Request-ID: web-78c1ad63af08ce9cab03346c14d4728d-ufo06d

Then the first electronic device 104 generates the second version of the request identifier by adding the identifier of the first subsystem 105 to the invariable part of the request identifier:

Yandex-Cloud-Request-PATH: mpfs13h

Thus, the first electronic device 104 has generated the second version of the request identifier as follows:

Yandex-Cloud-Request-ID: web-78c1ad63af08ce9cab03346c14d4728d-ufo06d

Yandex-Cloud-Request-PATH: ufo06d mpfs13h

The first electronic device 104 stores the second version of the request identifier in the common data storage 302. Along with the second version of the request identifier, the first electronic device 104 can store in the common data storage 302 the request itself and the information associated with this request, for example, the information about processing this request by the first electronic device 104. The first version of the request identifier and the information concerning processing this request by the second electronic device 102 are still being stored in the common data storage 302.

The method 500 then proceeds to step 508.

Step 508—receiving, by the third electronic device 106 from the first electronic device 104, the request to process and the second version of the request identifier; generating, by the third electronic device 106, the third version of the request identifier and storing the third version of the request identifier in the common data storage 302

At step 508 the first electronic device 104 requests the "storage" component of the distributed data processing network 112 to provide the information about a place where the user's file has to be stored (for example, in this implementation of the present technology the "storage" component of the distributed data processing network 112 is implemented as the third electronic device 106). For this purpose the first electronic device 104 sends and the third electronic device 106 receives the request and the second version of the request identifier, which the second version of the request identifier was generated by the first electronic device 104.

The third electronic device 106, having received the request, then checks if the unique invariable part of the request identifier was received from the first electronic device 104. Having determined that headers of the request, the request being in the HTML, format, comprise the unique invariable part of the request identifier, the unique invariable part of the request identifier being recognized as such by the distributed data processing network 112, the third electronic device 106 keeps the request identifier non-changed:

Yandex-Cloud-Request-ID: web-78c1ad63af08ce9cab03346c14d4728d-ufo06d

Then the third electronic device 106 generates the third version of the request identifier by adding the identifier of the third subsystem 107 to the invariable part of the request identifier:

Yandex-Cloud-Request-PATH: kladun01g

Thus, the third electronic device 106 has generated the third version of the request identifier as follows:

Yandex-Cloud-Request-ID: web-78c1ad63af08ce9cab03346c14d4728d-ufo06d
    Yandex-Cloud-Request-PATH: ufo06d mpfs13h kladun01g The third electronic device 106 stores the third version of the request identifier in the common data storage 302. Along with the third version of the request identifier, the third electronic device 106 can store in the common data storage 302 the request itself and the information associated with this request, for example, the information about processing this request by the first electronic device 104.

The method 500 then proceeds to step 510.

Step 510—receiving, by the first electronic device 104 from the third electronic device 106, a demand to provide a request processing history At step 510, the third electronic device 106 can determine an error which prevents performing a required operation, or which allows performing the operation incorrectly. Thus, there may appear a need in receiving, by the third electronic device 106, the request processing history. As those skilled in the art will understand, the need in receiving the request processing history can be induced by other reasons. This example of determining an error is merely a non-limiting illustrative example. Moreover, functions of the third electronic device 106 which concern determining error reasons can be performed by other electronic devices, including dedicated devices.

To receive the request processing history, the third electronic device 106 addresses the electronic device, from which the request was received, i.e. the first electronic device 104 in this example, to obtain the request processing history. The first electronic device 104 receives such a demand from the third electronic device 106. However, as those skilled in the art will understand, the third electronic device 106 may not have to address the first electronic device 104 to obtain the request processing history; rather, the third electronic device 106 can receive the required information itself acting similar to the first electronic device 104 (as it is described in the paragraphs concerning steps 512 and 514 of the method 500).

The method 500 then proceeds to step 512.

Step 512—receiving, by the first electronic device 104, the most complete version of the request identifier from the common data storage 302

As it was described above, the common data storage 302 can contain several versions of the request identifier. The reason is that electronic devices which processed the request can generate various versions of request identifiers and store them in the common data storage 302. At steps 504, 506 and 508, the electronic devices 102, 104 and 106 generated the first, the second and the third version of the request identifier correspondingly, and each of electronic devices 102, 104 and 106 have stored the first, the second and the third version of the request identifier correspondingly in the common data storage 302.

At step 512, the first electronic device 104 retrieves the most complete version of the request identifier, by selecting the most complete version of the request identifier among the first, the second and the third versions of the request identifier. As those skilled in the art will appreciate, other electronic devices can directly receive the most complete version of the request identifier using similar ways; the other electronic devices are parts of subsystems 103, 107 and 109 which belong to the distributed data processing network 112. For example, the electronic devices 102, 106 and 108 can directly receive the most complete version of the request identifier.

For receiving the most complete version of the request identifier, the first electronic device 104 receives from the common data storage 302 all versions of the request identifier which are stored in the corresponding data storage, i.e. in this implementation of the present technology, the first version of the request identifier:

Yandex-Cloud-Request-ID: web-78c1ad63af08ce9cab03346c14d4728d-ufo06d
    Yandex-Cloud-Request-PATH: ufo06d the second version of the request identifier:

Yandex-Cloud-Request-ID: web-78c1ad63af08ce9cab03346c14d4728d-ufo06d
    Yandex-Cloud-Request-PATH: ufo06d mpfs13h and the third version of the request identifier:

Yandex-Cloud-Request-ID: web-78c1ad63af08ce9cab03346c14d4728d-ufo06d
    Yandex-Cloud-Request-PATH: ufo06d mpfs13h kladun01g Due to the fact that the common data storage 302 comprises three versions of the request identifier (i.e. more than one version of the request identifier), the first electronic device 104 defines, as the most complete version of the request identifier, a version which includes most request identifiers. In the given example, the most complete version of the request identifier is the third version of the request identifier, which the third version of the request identifier includes three subsystem identifiers (ufo06d, mpfs13h and kladun01g).

The method 500 then proceeds to step 514.

Step 514—reading, by the first electronic device 104, from the most complete version of the request identifier, all the subsystem identifiers included in the most complete version of the request identifier, and accessing data storages of the corresponding subsystems for receiving from them the information about request processing, and providing the history of the request processing to the third electronic device 106

At step 514 the first electronic device 104 reads from the most complete version of the request identifier (in this case from the third version of the request identifier) all the subsystem identifiers which subsystem identifiers are included in this version, more specifically: ufo06d mpfs13h and kladun01g. As it was mentioned above, the identifier ufo06d is the identifier of the second subsystem 103, the identifier mpfs13h is the identifier of the second subsystem 105, the identifier kladun01g is the identifier of the second subsystem 107.

Thus, the first electronic device 104 has to access to data storages of corresponding subsystems to obtain the information about processing.

As it was mentioned above, functions of the data storages 1042, 1022, 1062 and 1082 in the distributed data processing network 112, in this implementation of the present technology, are performed by the common data storage 302. Thus, in this implementation of the present technology, the common data storage 302 will represent a data storage for different versions of request identifiers and for the request itself, and also for the information associated with this request, for example, the information about processing this request.

Thus, the first electronic device 104, to receive the information about request processing, has to access the common data storage 302, which the common data storage 302 can store the request itself and the information associated with this request, for example, the information about processing this request by the second electronic device 102, by the first electronic device 104, and by the third electronic device 106.

The first electronic device 104 receives, from the common data storage 302, the information associated with the request, in particular, the information about processing this request by the second electronic device 102, by the first electronic device 104 and by the third electronic device 106. Then, the first electronic device 104 provides this information to the third electronic device 106.

In alternative implementations of the present technology, the distributed data processing network 112 can simultaneously include the common data storage 302 as well as the data storages 1042, 1022, 1062, and 1082 of the subsystems 103, 105, 107 and 109; the data storages 1042, 1022, 1062 and 1082 being parts of or associated with the electronic devices 102, 104, 106 and 108 correspondingly. In such alternative implementations of the present technology, the common data storage 302 can be used for storing versions of the request identifiers, and the data storages 1042, 1022, 1062 and 1082 can be used for storing the request itself and the information associated with the request, in particular, the information about processing this request by the different electronic devices (for example, by at least some electronic devices of the electronic devices 102, 104, 106 and 108). In such implementations of the present technology, the first electronic device 104 can receive the most complete version of the request identifier from the common data storage 302, receive subsystem identifiers from the most complete version of the request identifier, and then access data storages of the corresponding subsystems, which can be, for example, one data storage or some data storages or all the data storages 1042, 1022, 1062 and 1082, and not the common data storage 302. As those skilled in the art will appreciate, the common data storage 302 can be implemented as a common database or as a log-file of the distributed data processing network.

The method 500 then terminates.

Within the present description it should be understood that in any case where retrieving data from any client device and/or from any mail server is mentioned, retrieving an electronic or other signal from corresponding client device (a server, a mail server) can be used, and displaying on a screen of the device can be implemented as transmitting a signal to the screen, the signal includes specific information which further can be interpreted with specific images and at least partially displayed on the screen of the client device. Sending and receiving the signal is not mentioned in some cases within the present description to simplify the description and as an aid to understanding. Signals can be transmitted using optical methods (for example, using fiber-optic communication), electronic methods (wired or wireless communication), mechanic methods (transmitting pressure, temperature and/or other physical parameters by the means of which transmitting a signal is possible.

The invention claimed is:

1. A computer-implemented method of processing a request, the method being executable on a first electronic device, the first electronic device being connected to a second electronic device and a third electronic device, the second electronic device being at least a part of a second subsystem, the first electronic device being at least a part of a first subsystem, the third electronic device being at least a part of a third subsystem, the second subsystem, the third subsystem and the first subsystem being at least a part of a distributed data processing system, the first electronic device and the second electronic device having respectively a first subsystem identifier and a second subsystem identifier associated with them correspondingly, the method comprises:
   receiving, by the first electronic device from the second electronic device, the request to be processed and a first version of a request identifier, the first version of the request identifier comprising:
      a unique invariable part of the request identifier and the second subsystem identifier;
   generating, by the first electronic device, a second version of the request identifier by including the first subsystem identifier into the first version of the request identifier;
   transmitting, by the first electronic device to the third electronic device, the request and the second version of the request identifier;
   receiving, by the first electronic device from the third electronic device, a demand to provide a request processing history; and,
   responsive to receiving the demand to provide the request history:
      obtaining, by the first electronic device, a most complete version of the request identifier;
      reading, by the first electronic device, subsystem identifiers from the most complete version of the request identifier, the subsystem identifiers comprising the first subsystem identifier and the second subsystem identifier;
      determining, by the first electronic device, the request processing history by
         retrieving, by the first electronic device from a first data storage of the first subsystem, information about processing of the request by the first electronic device, and
         retrieving, by the first electronic device from a second data storage of the second subsystem, information about processing of the request by the second electronic device; and
      transmitting, by the first electronic device, the request processing history from the first electronic device to the third electronic device.

2. The method of claim 1, wherein (i) the request to be processed, received by the first electronic device from the second electronic device, and (ii) the unique invariable part of the request identifier, and (iii) the first version of the request identifier, were generated by the second electronic device.

3. The method of claim 1, wherein
   (i) the request to be processed, received by the first electronic device from the second electronic device, had been previously received by the second electronic device from a client device, and
   (ii) the first version of the request identifier received by the first electronic device from the second electronic device was generated by the second electronic device,
   wherein generating the first version of the request identifier by the second electronic device was performed using one of:
      (a) the unique invariable part of the request identifier generated by the second electronic device and
      (b) the unique invariable part of the request identifier received by the second electronic device from the client device.

4. The method of claim 1, wherein a plurality of requests are processed in the distributed data processing network, and wherein the unique invariable part of the request identifier is an alphanumeric sequence, said alphanumeric sequence being unique among other request identifiers.

5. The method of claim 1, wherein the second version of the request identifier can be modified by the third electronic device by including a third subsystem identifier into the second version of the request identifier in addition to the second subsystem identifier and the first subsystem identifier.

6. The method of claim 1, further comprising storing, by the first electronic device, the second version of the request identifier in the first data storage.

7. The method of claim 1, wherein the first version of the request identifier was stored by the second electronic device in the second data storage.

8. The method of claim 1, further comprising storing, by the first electronic device, the information about request processing by the first electronic device in the first data storage.

9. The method of claim 1, wherein the information about request processing by the second electronic device was stored by the second electronic device in the second data storage.

10. The method of claim 6, wherein the first version of the request identifier was stored by the second electronic device in the second data storage, and wherein the second data storage is a second subsystem log file and the first data storage is a first subsystem log file.

11. The method of claim 6, wherein the first version of the request identifier was stored by the second electronic device in the second data storage, and wherein the second data storage and first data storage are implemented as a log file of the distributed data processing network.

12. The method of claim 6, wherein the first version of the request identifier was stored by the second electronic device in the second data storage, and wherein the second data storage and first data storage are implemented as a common database.

13. The method of claim 1, wherein the subsystem identifiers from the most complete version of the request identifier further comprise the other identifiers corresponding to other subsystems, and wherein the method further comprises:
responsive to receiving the demand to provide the request processing history:
reading, by the first electronic device, from the most complete version of the request identifier, all other subsystem identifiers, and
retrieving, by the first electronic device, information about processing of the request at the other subsystems from data storages of the other subsystems to determine the request processing history.

14. The method of claim 1,
wherein, to obtain the most complete version of the request identifier, the first electronic device:
receives from any one, selected from: (i) the log file of the distributed data processing network, and (ii) the common database, all versions of the request identifier being stored in a respective data storage and:
responsive to more than one version of the request identifier is available, determines a version of the request identifier comprising maximum subsystem identifiers as the most complete version of the request identifier.

15. A first electronic device including a communication interface for providing connection over a communication network, the first electronic device comprising a processor operationally connected with the communication interface, the first electronic device being connected with a second electronic device and a third electronic device, the second electronic device being at least a part of a second subsystem, the first electronic device being at least a part of a first subsystem, the third electronic device being at least a part of a third subsystem, the second subsystem, the third subsystem and the first subsystem being at least a part of a distributed data processing network, the first electronic device and the second electronic device having respectively a first subsystem identifier and a first subsystem identifier associated with them correspondingly, the processor of the first electronic device being configured such that the first electronic device may perform:
receiving, by the first electronic device from the second electronic device, a request to be processed and a first version of a request identifier, the first version of a request identifier comprising:
a unique invariable part of the request identifier and
a second subsystem identifier;
generating, by the first electronic device, a second version of the request identifier by including the first subsystem identifier into the first version of the request identifier;
transmitting, by the first electronic device to the third electronic device, the request and the second version of the request identifier;
receiving, by the first electronic device from the third electronic device, a demand to provide a request processing history; and,
responsive to receiving the demand to provide the request history:
obtaining, by the first electronic device, a most complete version of the request identifier;
reading, by the first electronic device, subsystem identifiers from the most complete version of the request identifier, the subsystem identifiers comprising the first subsystem identifier and the second subsystem identifier;
determining, by the first electronic device, the request processing history by
retrieving, by the first electronic device from a first data storage of the first subsystem, information about processing of the request by the first electronic device, and
retrieving, by the first electronic device from a second data storage of the second subsystem, information about processing of the request by the second electronic device; and
transmitting, by the first electronic device, the request processing history from the first electronic device to the third electronic device.

16. The first electronic device of claim 15, wherein (i) the request to be processed, received by the first electronic device from the second electronic device, and (ii) the unique invariable part of the request identifier, and (iii) the first version of the request identifier, were generated by the second electronic device.

17. The first electronic device of claim 15, wherein
(i) the request to be processed, received by the first electronic device from the second electronic device, had been previously received by the second electronic device from a client device, and
(ii) the first version of the request identifier received by the first electronic device from the second electronic device was generated by the second electronic device, wherein generating the first version of the request identifier by the second electronic device was performed using one of:
(a) the unique invariable part of the request identifier generated by the second electronic device and
(b) the unique invariable part of the request identifier received by the second electronic device from the client device.

18. The method of claim 1, wherein the most complete version of the request identifier is the second version of the request identifier.

19. The method of claim 1, wherein the second version of the request identifier is modifiable by the third electronic device by excluding, from the second version of the request identifier, at least one selected from: the second subsystem identifier and the first subsystem identifier.

* * * * *